(12) United States Patent
Appiah

(10) Patent No.: US 9,813,097 B2
(45) Date of Patent: Nov. 7, 2017

(54) MOISTURE RESISTANT MOBILE PHONE CASE

(71) Applicant: Kwame Appiah, Inglewood, CA (US)

(72) Inventor: Kwame Appiah, Inglewood, CA (US)

( * ) Notice: Subject to any disclaimer, the term of this patent is extended or adjusted under 35 U.S.C. 154(b) by 0 days.

(21) Appl. No.: 15/060,305

(22) Filed: Mar. 3, 2016

(65) Prior Publication Data

US 2017/0257132 A1    Sep. 7, 2017

(51) Int. Cl.
*H04M 1/00*     (2006.01)
*H04B 1/3888*   (2015.01)
*H04M 1/21*     (2006.01)

(52) U.S. Cl.
CPC ............ *H04B 1/3888* (2013.01); *H04M 1/21* (2013.01)

(58) Field of Classification Search
CPC ............................... H04B 1/3888; H04M 1/21
USPC ............................ 455/575.1, 575.8, 90.3, 557
See application file for complete search history.

(56) References Cited

U.S. PATENT DOCUMENTS

| | | | | |
|---|---|---|---|---|
| 6,839,432 B1* | 1/2005 | Martin | ................. | H04B 1/3888 379/428.01 |
| 8,342,325 B2* | 1/2013 | Rayner | ................. | G06F 1/1626 206/305 |
| 8,504,126 B1* | 8/2013 | Maravilla | ............ | H04B 1/3888 150/147 |
| 8,787,009 B2* | 7/2014 | Wilson | ................. | H04M 1/185 312/296 |
| 8,899,457 B1* | 12/2014 | Maus | ....................... | A45F 5/021 224/663 |
| 8,955,678 B2* | 2/2015 | Murphy | .................. | B23P 19/00 206/320 |
| 9,220,328 B2* | 12/2015 | Magness | ................. | A45C 11/00 |
| 9,223,346 B2* | 12/2015 | Wilson | ................. | H04B 1/3888 |
| 9,241,051 B1* | 1/2016 | Peterson, III | ....... | H04M 1/0264 |
| 9,402,452 B2* | 8/2016 | Diebel | .................. | G06F 1/1628 |
| 9,450,634 B2* | 9/2016 | Rayner | ................... | G06F 1/163 |
| 9,462,099 B2* | 10/2016 | Wilson | .................. | H04M 1/185 |
| 9,469,469 B2* | 10/2016 | Rayner | ................. | G06F 1/1626 |
| 2010/0134964 A1* | 6/2010 | Smith | ................. | B60R 11/0252 361/679.2 |
| 2012/0244920 A1* | 9/2012 | Lee | ....................... | H04B 1/3888 455/575.8 |
| 2013/0146661 A1* | 6/2013 | Melbrod | ................ | G06K 19/12 235/435 |
| 2013/0164178 A1* | 6/2013 | Carmichael | ............... | A61L 9/12 422/123 |

(Continued)

*Primary Examiner* — Marceau Milord
(74) *Attorney, Agent, or Firm* — Fulwider Patton LLP

(57) ABSTRACT

A phone case made of durable, high grade plastic, aluminum, or similar material in the form of a base and door is disclosed. The door is attached to the base with either an elongate hinge or first and second pins mounted in the base and about which the door pivots from an open to a closed position and back again. The base is designed to receive and seat the phone snugly therein, and is preferably shaped to enclose the phone in a substantially rigid and compact housing that conforms with the shape of the phone. The door preferably pivots from the lower portion of the base about the hinge, and a latching mechanism is positioned at the top of the base's opening to capture and secure the door when closed. The tolerances of the fit between the door and the base are such that moisture will not seep into the case when the door is closed.

11 Claims, 3 Drawing Sheets

(56) References Cited

U.S. PATENT DOCUMENTS

| | | | |
|---|---|---|---|
| 2013/0273944 A1* | 10/2013 | Wilson | H04M 1/026 455/457 |
| 2014/0162729 A1* | 6/2014 | Garden | H04B 1/3888 455/566 |
| 2015/0156297 A1* | 6/2015 | Crawford | H04M 1/0262 455/26.1 |
| 2016/0066460 A1* | 3/2016 | Rayner | A45C 13/008 224/191 |
| 2016/0219202 A1* | 7/2016 | Barros | H04N 5/2252 |
| 2016/0249472 A1* | 8/2016 | Tu | A45C 11/00 |
| 2016/0291473 A1* | 10/2016 | Kwak | G03F 7/20 |
| 2017/0026498 A1* | 1/2017 | Goldfain | A45C 11/182 |

\* cited by examiner

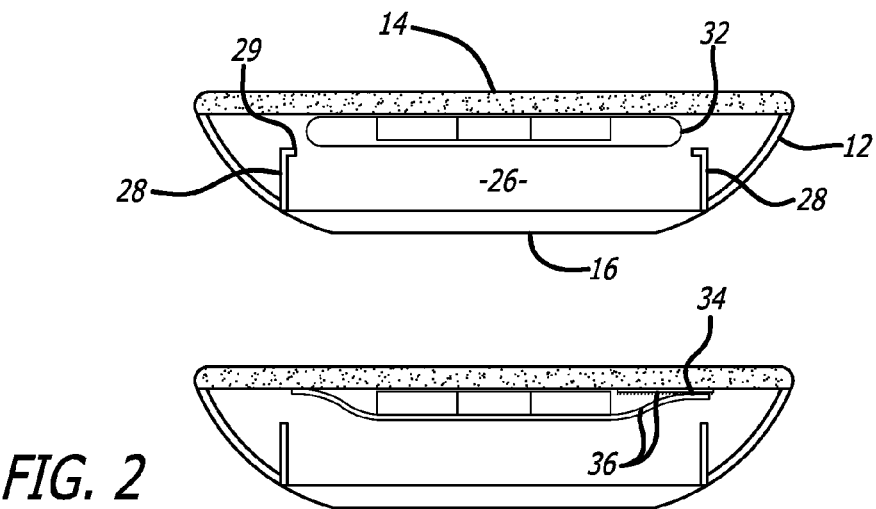
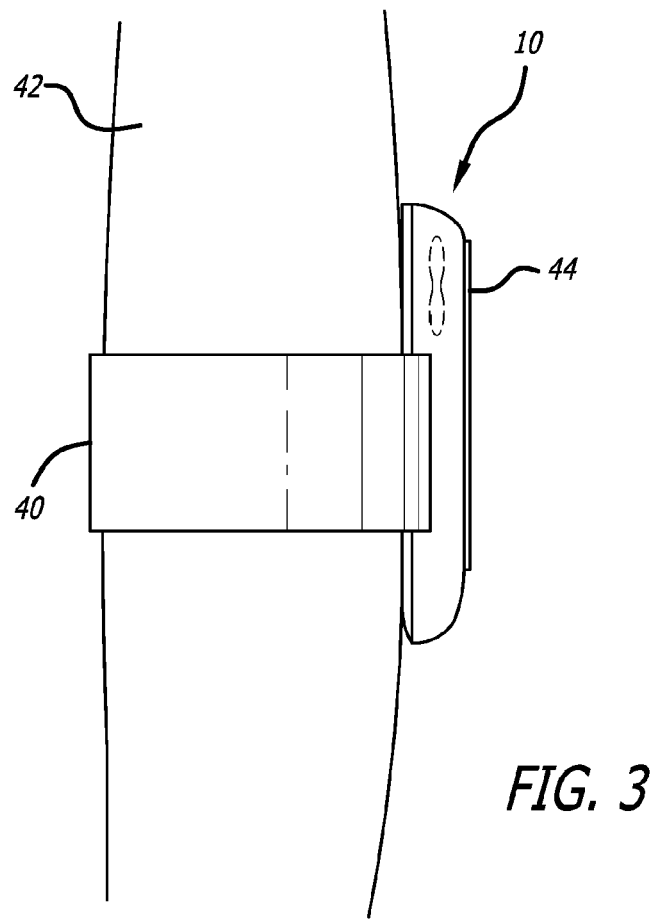

MOISTURE RESISTANT MOBILE PHONE CASE

BACKGROUND

Mobile telephones with multi-function capability, or "smart phones," have become prevalent in our society over the last decade. Smart phones with their capacity to download applications have become so intricate to an owner's daily routine that many people are never without their smart phone. While the comfort of having the smart phone twenty-four hours a day is reassuring, this can also pose problems due to the sensitivity of electronic devices to certain environmental conditions such as heat, moisture, dust, and the like.

For this reason, smart phone cases have become commonplace as well. Such cases are used to shield the smart phones from shock, and to keep dust away from the device while protecting the sensitive screen or antenna. The art is plentiful with various phone cases that have both aesthetic and practical utility. However, certain improvements are still possible with smart phone cases that will further protect the phone and provide additional convenience.

Many people like to have their phone with them for activities such as exercising at a gym or running/biking/jogging outdoors on a trail. While it is desirable to have a smart phone at hand during these activities (especially of the smart phone is performing a task related to the activity such as playing music, timing a run, or monitoring a workout), sweat and moisture can invade a smart phone through a case or holder and damage or ruin the phone. Given the high costs of these smart phones, it would be desirable to have a case and band that could keep the phone in a convenient location (such as an armband to secure the phone to the user's upper arm) while being constructed in such as manner as to protect the phone from moisture through sweat, light rain, spilled water, etc. The present invention solves this dilemma with a stylish, secure, light-weight phone case that is moisture resistant and capable of being worn easily and securely.

It is preferable that the invention be developed in multiple sizes, to accommodate other items besides phones. For example, a smaller version of the invention can be created for sets of keys or a smaller electronic device such as a beeper. The smaller version would work the same as the larger version, but be less intrusive for smaller items. In another preferred embodiment, the phone case includes a separate compartment for securing a key or the like.

SUMMARY OF THE INVENTION

The present invention is a phone case made of durable, high grade plastic, aluminum, or similar material in the form of a base and a pivoting door. The door is attached to the base with either a single elongate hinge or first and second pins mounted in the base and about which the door pivots from an open to a closed position and back again. Alternatively, the door can snap into place in the base using locking tabs or the like. The base is shaped to receive and seat the phone snugly therein, and is preferably designed to enclose the phone in a substantially rigid and cushioned housing that conforms with the shape of the phone. The door may include guides on each lateral edge that recede into the base when the door closes, and provide a pocket that holds the phone when the case is opened. One or more tabs or retaining structures may also be incorporated into the case to hold the phone in the housing, similar to a cassette deck's retention of an audio cassette. The door preferably pivots from the lower portion of the base about the hinge, and a latching mechanism is positioned at the top of the base's opening to capture and secure the door when closed. The tolerances of the fit between the door and the base are such that moisture will not seep into the case when the door is closed, protecting the phone from sweat and other moisture during a workout or in the presence of steam, rain, and the like.

In a preferred embodiment, the phone case further includes structure for retaining a key or set of keys. The key retention structure may be a strap with a hook and loop fastening system (e.g., VELCRO®), or it may be a small pouch that cinches at the top to tightly capture keys without a rattle and without scratching the phone's case. This dual purpose case allows a user to go for a run, go to the gym, etc., or do activities that do not lend themselves to having a bulky phone and keys in his or her pockets, and keep the phone and keys in a secure location. Alternatively, the case could be constructed in a smaller format to accommodate the keys alone, or other such personal item.

An arm band is preferably integrated with the case to allow the case to be secured to a user's arm. The armband is secured with hook and loop fastener material (e.g., VELCRO®) and is constructed of elastic material that expands and stretches to provide a tight yet comfortable fit. On the surface that bears against the user's skin or shirt, the band may be formed with undulated ridges of rubber or similar material to enhance the grip of the band when the user sweats. These undulating rubber ridges are preferably incorporated into the back of the case as well to better secure the case to the user's arm.

To make the case more attractive to younger users, the front of the case can include a three dimensional sculpture, engraving, relief depictions, or the like. In particular, the door may have a face, a design, artwork, caricature, celebrity, logo, promotional art, or other image formed with in a three dimensional medium. In other embodiments, the case can include light emitting or reflecting devices such as reflectors, LED lights, LED screens, and other illumination mechanisms. The illuminated devices can be powered by an external source, such as a small battery, by the movement of the wearer, or by other powered devices.

These, and other features, will best be understood by reference to the figures and the detailed description of the invention below.

BRIEF DESCRIPTION OF THE DRAWINGS

FIG. 2 is a cross-sectional top view of first and second embodiments of the present invention;

FIG. 3 is a side view of the case of the present invention worn on a user's arm.

DETAILED DESCRIPTION OF THE PREFERRED EMBODIMENTS

Figure 1:
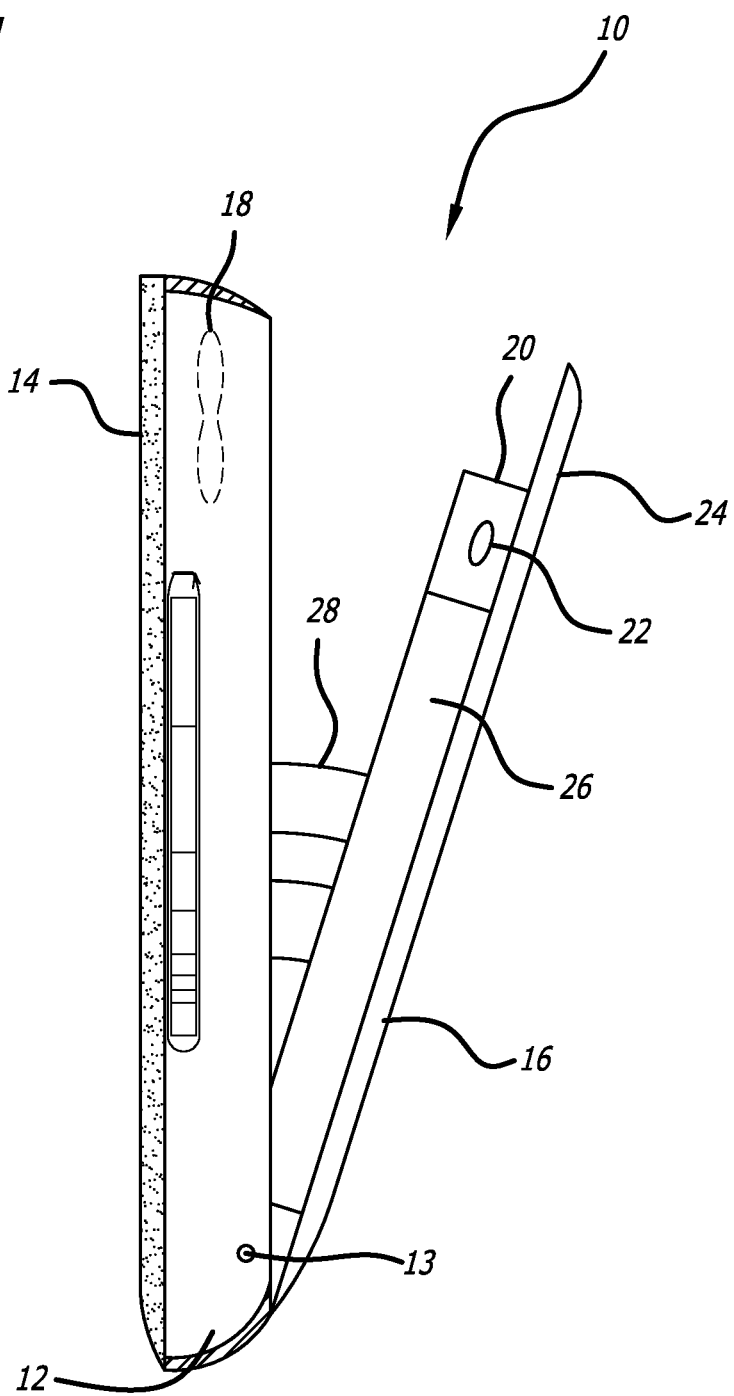
FIG. 1 is a side view of the case of the present invention.

FIG. 1 illustrates a hard shell phone case 10 for a smart phone such as an "iPhone®" or the like. The case 10 is comprised of a base 12 having a soft rubber or polymer backing 14 to cushion the case and a door 16 to open and close the case 10. The base 12 is formed of a hardened plastic, metal, or other suitable material and forms an enclosure for the phone. The base preferably includes buttons 18 that can be depressed to operate buttons 22 on the phone 20, where the location of the buttons 18 (and size and shape of the case) would be specific to a particular phone model. In this way, the phone can be activated and deactivated while within the case. Similarly, the case 10 could include a plastic or transparent window on a front surface 24 through which the phone's screen could be viewed.

The phone easily slides into a sleeve 26 in the door 16 formed with guides 28 on both sides of the sleeve 26. The guides 28 are rigidly connected to the door 16 and are exposed when the door is open (see FIG. 1), and recede into openings (not shown) in the base 12 when the door 16 is closed. The sleeve 26 cooperates with the door 16 to form a slot where the phone 20 is seated, and can be further complimented with tabs 29 or fingers that hold the phone 20 firmly against the door 16. The door 16 is hinged to the base 12 at a lower edge, where a hinge 13 connects the two components and allows the door to pivot about the hinge 13. The hinge can also be replaced with two pins that connect the door and the base and allow rotation of the door about the pins. It is also possible that the door 16 could be hinged on the side of the case 10 and open laterally rather than vertically as shown.

Inside the case 10, in a preferred embodiment a key pouch 32 is disposed in the base 12 opposite the sleeve 26 to retain a set of keys. The pouch 32 can be a soft cloth material sewn into or glued to the base 12, and includes an opening that incorporates a drawstring that may be cinched tight to close the opening once the keys are inserted. The drawstring can be released to open the pouch and withdraw the keys at any time once the door 16 is opened. Alternatively, the keys can be secured by a strap arrangement 34 (see FIG. 2) where first and second straps 36 wrap tightly around the keys and are fastened together using a hook and loop fastener arrangement such as VELCRO® or the like. The key holder 32 preferably has a slim profile to prevent the case 10 from being unnecessarily thick, which is found by most users to be undesirable.

Figure 4:
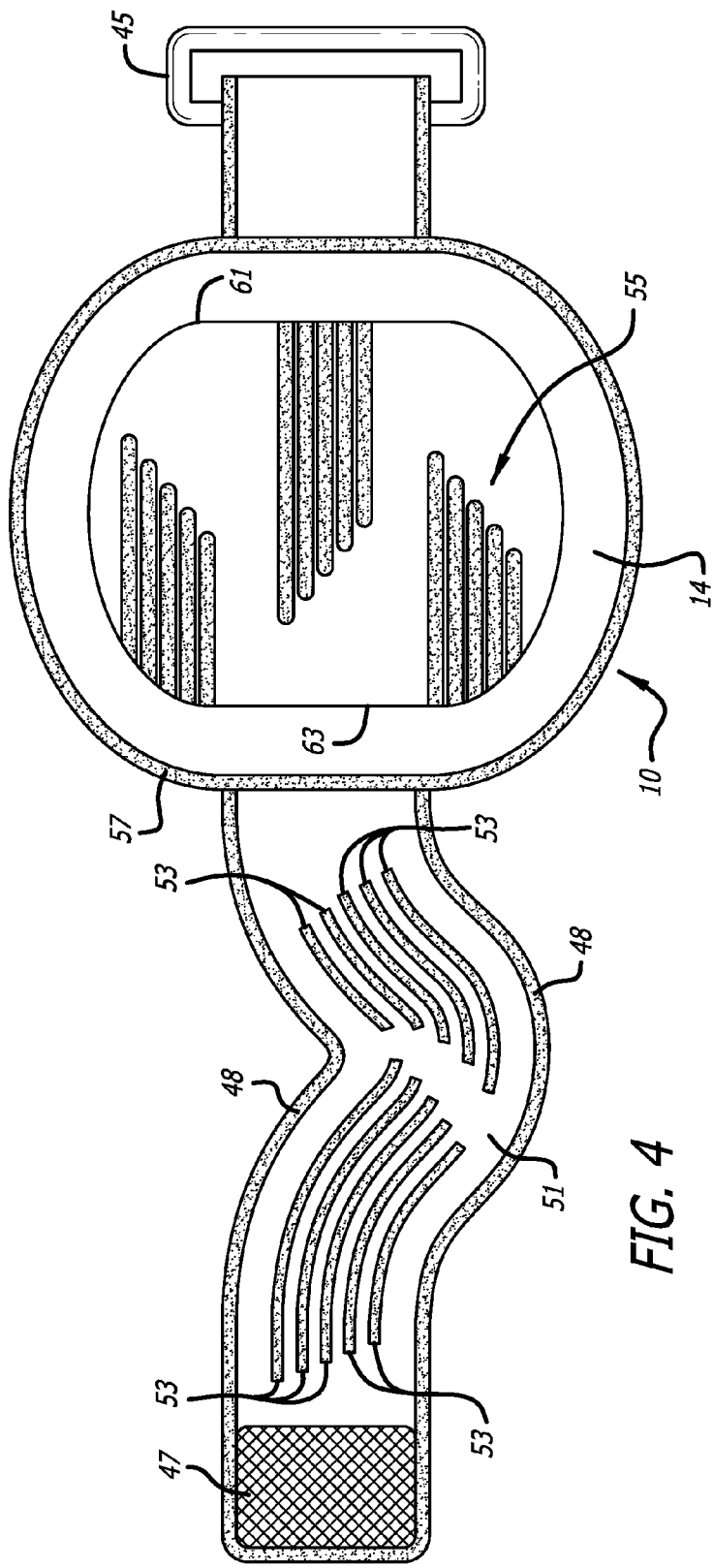
FIG. 4 is a rear view of the case and arm band of the present invention.

In a preferred embodiment, the case further includes an arm band 40 that allows the case 10 to be secured to the user's upper arm 42 (FIG. 3). The arm band 40 can be attached on one side of the case 10, and form a loop around the arm while passing through a buckle or loop 45 on the other side of the case. The arm band's distal end may include a hook and loop fastening material 47 that attaches to the outer surface of the arm band 40 to secure the armband and case 10 to the arm 42. In FIG. 4, the arm band 40 has a peripheral rubber edge 48 that borders an elastic material 51 having the ability to stretch and rebound to its original shape. Sewn or glued to the elastic material 51 are a plurality of undulating rubber ridges 53 that provide a tactile surface on the arm band 40 to prevent slipping. Rubber ridges 55 are also preferably affixed to the back of the case 10 to enhance the friction of the case against the user, where the plurality of rubber ridges 55 are arranged in groups that emanate from alternate sides 61,63 of the case 10. A peripheral rubber strip 57 encircles the polymer backing 14 to prevent moisture from seeping behind the case and keep the interface as dry as possible.

On the outer surface of the door 16 may be a three dimensional expression, such as a face, a logo, or the like. The door may have a reflector that reflects light, or be made with an luminescent coating or paint that allows the image to glow in the dark. The case 10 may also incorporate a small LED clock or alarm (not shown) that can be used as a timer when working out. In yet another preferred embodiment, the case can have a small screen such as an LED screen 44 or other type screen that can display video content, emit light patterns, or operate as a beacon to warn motorists or rescuers in low light conditions.

The fit of the door to the base is of a tolerance that prevents moisture from passing through the connection. In this manner, the case avoids the inclusion of rubber seals that may wear or fray and need to be replaced. Thus, moisture protection is achieved with a tolerance between the door and the base, which is preferably on the order of $\frac{1}{32}$ of an inch or less. This tolerance will prevent moisture from seeping into the case while still maintaining the capability to manufacture the case out of plastic or the like. Machining capabilities are well within this tolerance limit, and thus the invention does not need further barriers to moisture.

There are many possible combinations and adjustments that can be made to the phone case of the present invention, and the foregoing description is intended to describe one such embodiment. It is to be understood that alterations and refinements are widely understood to one of ordinary skill in the art, and that such alterations and refinements are part of the invention. Thus, the invention should not be limited to those figures and descriptions herein, but rather by a broad interpretation of the concepts described.

I claim:

1. A moisture resistant phone case for a phone, comprising:
   a base having an opening and a cavity sized to receive the phone, the base comprising buttons aligned with buttons the phone for operating the phone while within the case, the base further comprising a hinge along a lower edge and first and second slots along first and second lateral edges, respectively;
   a door sized to close the opening in the base, the door mounted on the hinge at the lower edge of the base for opening and closing thereabout, the door further comprising a sleeve to receive the phone when the door is opened, the sleeve including first and second guides mounted along the door's first and second lateral edges, the guides forming first and second spaced apart arcuate members for receiving the phone therebetween and each spaced apart arcuate member further includes an inwardly directed distal end tab projecting from a distal edge of the guide for biasing the phone against the door, the distal end tabs and the spaced apart walls capturing the phone within the door of the phone case, the guides cooperating with the first and second slots on the base such that the guides recede into the slots on the base when the door closes so that the door bears against the base with the phone retained in and against the door;
   the base further comprising an armband coupled to the base at a rear surface, the armband including a peripheral rubber edge that borders an elastic material that allows the armband to resiliently return to an original shape once stretched, the armband including undulating rubber ridges along an upper surface; and
   a peripheral rubber strip encircling a polymer backing on the base adjacent a bottom surface, the polymer backing including rubber ridges arranged in asymmetric groups that alternate from opposite sides of the case;
   wherein a tolerance of the fit between the door and the base prevents moisture from entering the cavity without a rubber seal disposed between the door and the base.

2. The moisture resistant phone case of claim 1, further comprising a key holder within the base, the key holder adapted to retain at least one key therein.

3. The moisture resistant phone case of claim 2, wherein the key holder is a pouch secured to the inside of the base, the pouch including a drawstring to cinch the pouch closed.

4. The moisture resistant phone case of claim 2, wherein the key holder is a pocket that may be closed by a hook and loop fastener arrangement.

5. The moisture resistant phone case of claim 2, wherein the key holder is a pair of straps that cross and fasten to tightly secure the key.

6. The moisture resistant phone case of claim 1, wherein a front surface of the base includes a three dimensional relief.

7. The moisture resistant phone case of claim 1, further comprising a screen for displaying light or images.

8. The moisture resistant phone case of claim 7, wherein the screen is an LED screen that can flash a warning light to motorists while a user is jogging.

9. The moisture resistant phone case of claim 7, wherein the screen is an LED screen that display a repeating pattern of images or lights.

10. The moisture resistant phone case of claim 1, wherein the phone case comes in different sizes to accommodate different phones.

11. The moisture resistant phone case of claim 1, wherein a front surface of the door includes a transparent window.

\* \* \* \* \*